United States Patent
Ogden et al.

(10) Patent No.: US 9,815,571 B1
(45) Date of Patent: Nov. 14, 2017

(54) AIRCRAFT ENERGY INDICATOR GENERATING SYSTEM, DEVICE, AND METHOD

(71) Applicant: Rockwell Collins, Inc., Cedar Rapids, IA (US)

(72) Inventors: Collin D. Ogden, North Liberty, IA (US); Bradley R. Mickelson, Cedar Rapids, IA (US); Kirk A. Kolek, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 147 days.

(21) Appl. No.: 14/638,522

(22) Filed: Mar. 4, 2015

(51) Int. Cl.
  G05D 1/00 (2006.01)
  G05D 1/06 (2006.01)
  B64D 45/08 (2006.01)
  B64D 43/00 (2006.01)
  B64D 47/02 (2006.01)

(52) U.S. Cl.
  CPC ............. B64D 45/08 (2013.01); B64D 43/00 (2013.01); B64D 47/02 (2013.01)

(58) Field of Classification Search
  None
  See application file for complete search history.

(56) References Cited

U.S. PATENT DOCUMENTS

| | | | | |
|---|---|---|---|---|
| 4,536,843 A * | 8/1985 | Lambregts | ........... | G05D 1/0638 244/181 |
| 4,750,127 A * | 6/1988 | Leslie | .................. | G05D 1/0005 244/183 |
| 5,289,185 A * | 2/1994 | Ramier | ................ | G01C 23/005 340/971 |
| 2009/0195413 A1* | 8/2009 | Constans | ............. | G05D 1/0676 340/971 |
| 2011/0251740 A1* | 10/2011 | Gomez Ledesma | ... | G05D 1/101 701/8 |
| 2014/0257602 A1* | 9/2014 | Gaston | .................. | G08G 5/025 701/16 |

* cited by examiner

*Primary Examiner* — Abby Lin
*Assistant Examiner* — Paul Castro
(74) *Attorney, Agent, or Firm* — Daniel M. Barbieri; Donna P. Suchy; Angel N. Gerdzhikov

(57) ABSTRACT

Present novel and non-trivial system, device, and method for generating an aircraft energy indicator(s) is disclosed. The energy indicator generating system is comprised of one or more sources of aircraft performance factors data, an image generator (IG), and a presentation system. The IG may be configured to receive the aircraft performance factors data representative of at least aircraft altitude and speed; determine descent path data as a function of at least the aircraft performance data; determine target aircraft energy data as a function of at least the descent path data; determine actual energy data as a function of at least the aircraft performance data; and generate presentation data as a function of the target energy data and the actual energy data, where the presentation data is representative of one or more images of an aircraft energy indicator presentable to a viewer.

20 Claims, 15 Drawing Sheets

| Target Altitude (ft) | Range (NM) | Target VTAS (kt) | Weight (lbs) | VPA (deg) | Target KE (MJ) | Target PE (MJ) | Target TE (MJ) |
|---|---|---|---|---|---|---|---|
| 45,000 | 0 | 459 | 74,998 | 0.0 | 948 | 4,657 | 5,605 |
| 40,000 | 18.8 | 459 | 74,953 | 2.8 | 948 | 4,137 | 5,085 |
| 35,000 | 33.2 | 461 | 74,924 | 4.0 | 956 | 3,618 | 4,575 |
| 30,000 | 44.3 | 466 | 74,905 | 3.4 | 976 | 3,101 | 4,077 |
| 25,000 | 57.9 | 432 | 74,880 | 3.5 | 837 | 2,583 | 3,420 |
| 20,000 | 70.9 | 400 | 74,852 | 3.7 | 719 | 2,066 | 2,785 |
| 15,000 | 83.4 | 371 | 74,821 | 3.8 | 620 | 1,549 | 2,169 |
| 11,000 | 92.9 | 350 | 74,794 | 4.1 | 551 | 1,135 | 1,686 |
| 10,000 | 99.2 | 289 | 74,776 | 1.4 | 374 | 1,032 | 1,406 |
| 5,000 | 113.6 | 268 | 74,718 | 3.3 | 323 | 515 | 838 |
| 2,100 | 121.7 | 258 | 74,680 | 3.4 | 297 | 216 | 513 |

FIG. 3A

|   | Actual Altitude (ft) | Range (NM) | Actual VTAS (kt) | Weight (lbs) | Actual KE (MJ) | Actual PE (MJ) | Actual TE (MJ) | TE Ratio | TE Percentage |
|---|---|---|---|---|---|---|---|---|---|
| A | 45,000 | 0 | 459 | 74,998 | 948 | 4,657 | 5,605 | 1.000 | 0.0% |
| B | 42,500 | 18.8 | 459 | 74,953 | 948 | 4,395 | 5,343 | 1.051 | 5.1% |
| C | 40,000 | 18.8 | 469 | 74,953 | 990 | 4,137 | 5,127 | 1.008 | 0.8% |
| D | 37,500 | 18.8 | 479 | 74,953 | 1032 | 3,879 | 4,911 | 0.966 | -3.4% |
| E | 32,500 | 44.3 | 466 | 74,905 | 976 | 3,359 | 4,335 | 1.063 | 6.3% |
| F | 30,000 | 44.3 | 456 | 74,905 | 935 | 3,101 | 4,036 | 0.990 | -1.0% |
| G | 27,500 | 44.3 | 446 | 74,905 | 894 | 2,842 | 3,736 | 0.916 | -8.4% |
| H | 22,500 | 70.9 | 400 | 74,852 | 719 | 2,342 | 3,043 | 1.093 | 9.3% |
| I | 20,000 | 70.9 | 410 | 74,852 | 755 | 2,066 | 2,821 | 1.013 | 1.3% |
| J | 17,500 | 70.9 | 420 | 74,852 | 793 | 1,807 | 2,600 | 0.934 | -6.6% |
| K | 12,500 | 99.2 | 289 | 74,776 | 374 | 1,290 | 1,664 | 1.184 | 18.4% |
| L | 10,000 | 99.2 | 279 | 74,776 | 349 | 1,032 | 1,381 | 0.982 | -1.8% |
| M | 7,500 | 99.2 | 269 | 74,776 | 325 | 774 | 1,099 | 0.782 | -21.8% |

FIG. 4A

| Actual Altitude (ft) | Actual VTAS (kt) | Actual TE (MJ) |
|---|---|---|
| 45,000 | 459 | 5,605 |
| 40,500 | 459 | 5,137 |
| 40,000 | 459 | 5,085 |
| 39,500 | 459 | 5,033 |
| 35,500 | 461 | 4,626 |
| 35,000 | 461 | 4,575 |
| 34,500 | 461 | 4,522 |
| 30,500 | 466 | 4,129 |
| 30,000 | 466 | 4,077 |
| 29,500 | 466 | 4,025 |
| 25,500 | 432 | 3,474 |
| 25,000 | 432 | 3,420 |
| 24,500 | 432 | 3,370 |
| 20,500 | 400 | 2,836 |
| 20,000 | 400 | 2,785 |
| 19,500 | 400 | 2,733 |
| 15,500 | 371 | 2,218 |
| 15,000 | 371 | 2,169 |
| 14,500 | 371 | 2,115 |
| 10,500 | 289 | 1,458 |
| 10,000 | 289 | 1,406 |
| 9,500 | 289 | 1,355 |
| 5,500 | 268 | 889 |
| 5,000 | 268 | 838 |
| 4,500 | 268 | 786 |

| | Max Position | Ref | Min Position |
|---|---|---|---|
| 40,000 | 5,137 | 5,085 | 5,032 |
| 35,000 | 4,626 | 4,575 | 4,522 |
| 30,000 | 4,129 | 4,077 | 4,025 |
| 25,000 | 3,474 | 3,420 | 3,370 |
| 20,000 | 2,836 | 2,785 | 2,733 |
| 15,000 | 2,218 | 2,169 | 2,115 |
| 10,000 | 1,458 | 1,406 | 1,355 |
| 5,000 | 889 | 838 | 786 |

Max (= +1.0)
Ref (= 0.0)
Min (= −1.0)

Example 1
Alt = 20,000
Actual TE = 2,800 MJ $$\text{Interpolation} = -\frac{(2,800 - 2,785)}{(2,836 - 2,785)}$$

$$= +0.29$$

Example 2
Alt = 30,000
Actual TE = 4,035 MJ $$\text{Interpolation} = -\frac{(4,035 - 4,077)}{(4,025 - 4,077)}$$

| | Actual Altitude (ft) | Range (NM) | Actual VTAS (kt) | Weight (lbs) | Actual KE (MJ) | Actual PE (MJ) | KE Ratio (MJ) | KE Percentage (MJ) | PE Ratio (MJ) | PE Percentage (MJ) |
|---|---|---|---|---|---|---|---|---|---|---|
| N | 45,000 | 0 | 459 | 74,998 | 948 | 4,657 | 1.000 | 0.0% | 1.000 | 0.0% |
| O | 42,500 | 18.8 | 459 | 74,953 | 948 | 4,395 | 1.000 | 0.0% | 1.062 | 6.2% |
| P | 40,000 | 18.8 | 469 | 74,953 | 990 | 4,137 | 1.044 | 4.4% | 1.000 | 0.0% |
| Q | 37,500 | 18.8 | 479 | 74,953 | 1,032 | 3,879 | 1.089 | 8.9% | 0.937 | -6.3% |
| R | 32,500 | 44.3 | 466 | 74,905 | 976 | 3,359 | 1.000 | 0.0% | 1.083 | 8.3% |
| S | 30,000 | 44.3 | 456 | 74,905 | 935 | 3,101 | 0.958 | -4.2% | 1.000 | 0.0% |
| T | 27,500 | 44.3 | 446 | 74,905 | 894 | 2,842 | 0.916 | -8.4% | 0.916 | -8.4% |
| U | 22,500 | 70.9 | 400 | 74,852 | 719 | 2,324 | 1.000 | 0.0% | 1.125 | 12.5% |
| V | 20,000 | 70.9 | 410 | 74,852 | 755 | 2,066 | 1.050 | 5.0% | 1.000 | 0.0% |
| W | 17,500 | 70.9 | 420 | 74,852 | 793 | 1,807 | 1.003 | 10.3% | 0.875 | -12.5% |
| X | 12,500 | 99.2 | 289 | 74,776 | 374 | 1,290 | 1.000 | 0.0% | 1.250 | 25.0% |
| Y | 10,000 | 99.2 | 279 | 74,776 | 349 | 1,032 | 0.933 | -6.7% | 1.000 | 0.0% |
| Z | 7,500 | 99.2 | 269 | 74,776 | 325 | 774 | 0.869 | -13.1% | 0.750 | -25.0% |

FIG. 6A

| Actual Altitude (ft) | Actual VTAS (kt) | Actual KE (MJ) | Actual KE Ratio |
|---|---|---|---|
| 45,000 | 459 | 948 | 1.00 |
| 40,000 | 474 | 1,011 | 1.07 |
| 40,000 | 459 | 948 | 1.00 |
| 40,000 | 444 | 887 | 0.94 |
| 35,000 | 476 | 1,020 | 1.07 |
| 35,000 | 461 | 956 | 1.00 |
| 35,000 | 446 | 895 | 0.94 |
| 30,000 | 481 | 1,040 | 1.07 |
| 30,000 | 466 | 976 | 1.00 |
| 30,000 | 451 | 914 | 0.94 |
| 25,000 | 447 | 896 | 1.07 |
| 25,000 | 432 | 837 | 1.00 |
| 25,000 | 417 | 780 | 0.93 |
| 20,000 | 415 | 774 | 1.08 |
| 20,000 | 400 | 719 | 1.00 |
| 20,000 | 385 | 666 | 0.93 |
| 15,000 | 386 | 671 | 1.08 |
| 15,000 | 371 | 620 | 1.00 |
| 15,000 | 356 | 571 | 0.92 |
| 10,000 | 304 | 415 | 1.11 |
| 10,000 | 289 | 375 | 1.00 |
| 10,000 | 274 | 337 | 0.90 |
| 5,000 | 283 | 359 | 1.12 |
| 5,000 | 268 | 322 | 1.00 |
| 5,000 | 253 | 287 | 0.89 |

|  | Max Position | Ref | Min Position |
|---|---|---|---|
| 40,000 | 1,011 | 948 | 887 |
| 35,000 | 1,020 | 956 | 895 |
| 30,000 | 1,040 | 976 | 914 |
| 25,000 | 896 | 837 | 780 |
| 20,000 | 774 | 719 | 666 |
| 15,000 | 671 | 620 | 571 |
| 10,000 | 415 | 375 | 337 |
| 5,000 | 359 | 322 | 287 |

FIG. 7A

AIRCRAFT ENERGY INDICATOR GENERATING SYSTEM, DEVICE, AND METHOD

BACKGROUND

Field of the Inventive Concepts

The inventive concepts disclosed herein pertain generally to the field of aircraft display units that present information to the pilot of an aircraft.

Description of the Related Art

A vertical descent path (VDP) of an aircraft's flight path is typically assigned a fixed vertical path angle (VPA). Perhaps the most common VPA is three degrees although this may differ due to, for instance, altitude constraints built into the VDP. When it comes time to fly the VDP, an aircraft system(s) may be configured (or programmed) to control the aircraft pitch so that the aircraft follows the VDP while maintaining a descent speed target through movement of the aircraft throttle(s). An autothrottle system may increase the speed of the aircraft by "adding throttle" (i.e., increasing engine thrust) and may decrease the speed by retarding the throttle without pilot intervention; however, the system may not decrease the throttle past a defined idle setting for the engines and, therefore may not reduce speed without pilot intervention of imparting "drag" through, for instance, the use of speed brakes if a speed brake system is installed. If the actual VDP path on which the aircraft is flying is too steep and the drag is insufficient, the system may not be able to maintain the descent speed. When the VPA is a fixed, three degree angle, the amount of throttle required to maintain the VDP is typically above idle. The excess fuel consumption—the amount of fuel needed to power the engines above idle—increases operating costs as fuel is wasted in light of the relatively large amount of total energy available to the aircraft during descent.

A flight idle descent (FID) path could be employed by utilizing predictive atmospheric conditions, and the physical performance of the aircraft may be employed by an algorithm(s) to determine an ideal descent path that may never require the aircraft's throttles to move above idle and never require pilot intervention to impart additional drag. The aircraft's available total energy comprised of available potential energy and kinetic energy may be exploited along the FID path such that the total energy expended equals the energy required to maintain the desired descent speed of the FID path. Performance factors such as, for example, the drag of the aircraft, the predicted temperatures and winds at points along the path, and weight of the aircraft may be used to create a FID path. The FID path may start from a Top of Descent (TOD) and end at approach start point (ASP) or a defined waypoint such as, for example, a final approach fix of an instrument approach procedure. If the FID path requires a change of speed, this is achieved simply by changing the VPA without having to adjust the throttles. Speed may be maintained through the descent by changing the VPA to manage the conversion of potential energy to kinetic energy without the use of throttles.

The TOD is the point if flight where, if the engine thrust is reduced to idle and/or continues to operate at idle, the aircraft decelerates throughout the approach while reducing fuel consumption and reaching flap/slat retraction speeds and/or final approach speed. Unlike the FID path, the ASP could be defined by a specific geometric, fixed-angle path that is not subjected to being altered, a determining factor in locating its start point.

SUMMARY

The embodiments disclosed herein are directed to a system, device, and method for generating an energy indicator that is presentable to a pilot. The indicator could be used in conjunction with the FID path to enhance situational awareness of a pilot by informing him or her whether excess energy will need to be bled off or a shortage of energy will need to be compensated by adding engine thrust.

In one aspect, embodiments of the inventive concepts disclosed herein are directed to a system for generating aircraft energy indicator(s). The system may include a source of aircraft performance factor data, an image generator (IG), and a presentation system. In some embodiments, the presentation system may include a visual display unit, an aural advisory unit, and/or a tactile advisory unit.

In another aspect, embodiments of the inventive concepts disclosed herein are directed to a device for generating aircraft energy indicator(s). The device may include the IG and may be configured (or programmed) to perform a method of generating energy indicator(s) presentable to a viewer.

In a further aspect, embodiments of the inventive concepts disclosed herein are directed to a method for generating aircraft energy indicator(s). When properly configured, the IG may acquire aircraft performance factor data, determine descent path data as a function of at least the aircraft performance factor, determine target aircraft energy data as a function of at least the descent path data, determine actual aircraft energy data as a function of at least the aircraft performance factor data, and generate presentation data as a function of the first energy data and the second energy data. The target aircraft energy data could include target aircraft potential energy, target aircraft kinetic energy, target aircraft total energy, or any combination of these. The actual aircraft energy data could include actual aircraft potential energy, actual aircraft kinetic energy, actual aircraft total energy, or any combination of these.

BRIEF DESCRIPTION OF THE DRAWINGS

FIG. 3A presents a table containing results from a hypothetical flight idle descent algorithm.

FIG. 4A presents a table containing total energy ratios at various altitudes and speeds.

FIG. 5A illustrates maximum and minimum deviations of an energy indictor correlated to maximum altitude deviations.

FIG. 6A presents a table containing kinetic and potential energy ratios at various altitudes and speeds.

FIG. 7A illustrates maximum and minimum deviations of an energy indictor correlated to maximum speed deviations.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details, or in combination with other components. In other instances, well-known implementations or operations are not shown or described in detail to avoid obscuring aspects of various embodiments of the inventive concepts disclosed herein.

Figure 1:
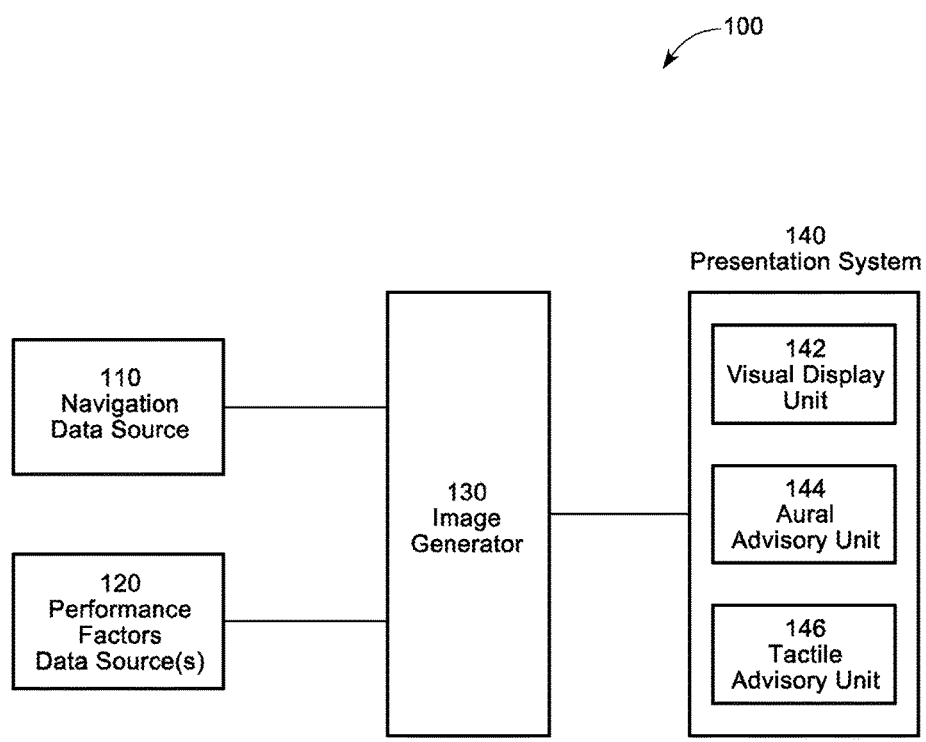
FIG. 1 depicts a functional block diagram of an embodiment of a system for generating an energy indicator.

FIG. 1 depicts a functional block diagram of an embodiment of an energy indicator generating system 100 suitable for implementation of the techniques described herein. The functional blocks of the system 100 include a navigation data source 110, a performance factors data source 120, an image generator (IG) 130, and a presentation system 140.

The navigation data source 110 could include any source(s) which provides navigation data information in an aircraft. The navigation data source 110 may include, but is not limited to, an air/data system, an attitude heading reference system, an inertial guidance system (or inertial reference system), and a global navigation satellite system (or satellite navigation system), all of which are known to those skilled in the art. The navigation data source 110 could provide navigation data including, but not limited to, geographic position, altitude, heading, attitude, ground speed, air speed, and/or time. Aircraft position may be comprised of geographic position (e.g., latitude and longitude coordinates) and altitude, and ground track may be derived from either geographic position, aircraft position, or both. Aircraft orientation may be comprised of pitch, roll, and/or yaw information related to the attitude of the aircraft.

The navigation data source 110 could further include a flight management system (FMS) which could perform a variety of functions to help the crew in the management of the flight. These functions could include receiving a flight plan (i.e., planned trajectory) and constructing a lateral and vertical flight plan (i.e., planned lateral and vertical trajectories) from the flight plan. The flight plan could be comprised of a series of waypoints, where each waypoint could include an altitude constraint associated with it. A pilot could create a flight plan by entering waypoints stored in a database or select a flight plan stored in a database of the FMS. In some embodiments, the flight plan could be received and loaded into the FMS automatically through a data link system.

In the performance of its many functions, the FMS could compute a variety of distances and/or surface lengths. Further, distances and/or lengths could be computed by the pilot and entered into the FMS in some embodiments. The FMS may perform a variety of functions to help the crew in the management of the flight. In the performance of its many functions, the FMS may receive navigation data from the navigation data source 110 such as those discussed above.

It should be noted that, in some embodiments for any source or system in an aircraft including the navigation data source 110, data could be comprised of any analog or digital signal, either discrete or continuous, which could contain information or be indicative of information. In some embodiments, aircraft could mean any vehicle which is able to fly through the air or atmosphere including, but not limited to, lighter than air vehicles and heavier than air vehicles, wherein the latter may include manned or unmanned fixed-wing and rotary-wing vehicles.

The performance factors data source 120 could be comprised of any source or combination of sources—including the navigation data source 110—that could provide aircraft performance factors which may be employed to define aircraft performance and determine a plurality of descent paths and/or descent path profiles as discussed herein. For example, the performance factors data source 120 could be comprised of one or more aircraft systems or components thereof. The performance factors data source 120 could include real-time system or sensor data, signal input from a plurality of aircraft systems or sensors, and information from any database or source. Detailed discussions of the aircraft performance factors and the employment thereof have been disclosed (and discussed as input factors) by Wichgers et al in U.S. Pat. No. 8,234,020 entitled "System and Methods for Generating Alert Signals in a Terrain Awareness Warning System," which is incorporated herein by reference in its entirety. In some embodiments, the performance factors data source 120 could be configured to provide aircraft performance factors data to the IG 130 for subsequent processing as discussed herein.

The IG 130 could include any electronic data processing unit which executes software or computer instruction code that could be stored, permanently or temporarily, in a digital memory storage device or a non-transitory computer-readable media including, but not limited to, random access memory (RAM), read-only memory (ROM), compact disc (CD), hard disk drive, diskette, solid-state memory, Personal Computer Memory Card International Association card (PC-MCIA card), secure digital cards, and compact flash cards. The IG 130 may be driven by the execution of software or computer instruction code containing algorithms developed for the specific functions embodied herein. The IG 130 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the IG 130 could also consist of more than one electronic data processing unit. In some embodiments, the IG 130 could be a processor(s) used by or in conjunction with any other system of the aircraft including, but not limited to, the navigation data source 110, the performance factors data source 120, and the presentation system 140.

In some embodiments, the terms "programmed" and "configured" are synonymous. The IG 130 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a data bus, through a wireless network, or as a signal received and/or transmitted by the IG 130 via a physical or a virtual computer port. The IG 130 may be programmed or configured to execute the method discussed in detail below. The IG 130 may be programmed or configured to provide output data to various systems and/or units including, but not limited to, the presentation system 140.

The presentation system 140 could be comprised of any unit of which visual, aural, and/or tactile indications may be presented to the pilot including, but not limited to, a visual display unit(s) 142, an aural advisory unit 144, and/or a tactile advisory unit 146. The visual display unit 142 could be comprised of any unit of which information may be presented visually to the pilot. The visual display unit 142 could be part of an Electronic Flight Information System (EFIS) and could be comprised of, but is not limited to, a Primary Flight Display (PFD), Navigation Display (ND), Head-Up Display (HUD), Head-Down Display (HDD), Multi-Purpose Control Display Unit, Engine Indicating and Crew Alerting System, Electronic Centralized Aircraft Monitor, Multi-Function Display, Side Displays, Electronic Flight Bags, Portable Electronic Devices (e.g., laptops, smartphones, tablets, and/or user-wearable devices such as head mounted devices).

The visual display unit 142 could be capable of projecting and/or presenting a one or more energy indicators. Energy indicators may be presented graphically and/or textually as disclosed below. Energy indicators may include alerts and/or non-alert(s). Alerts may be based on level of threat or conditions requiring immediate crew awareness or attention. Caution alerts may be alerts requiring immediate crew awareness in which subsequent corrective action will normally be necessary. Warning alerts may be alerts requiring immediate crew action. In some embodiments, both caution and warning alerts may be presented in combination with or simultaneous to aural advisories and/or tactile advisories. Non-alerts may be any other information not requiring immediate crew attention or awareness. Alerts may be presented visually by depicting one or more colors and may be presented on a display unit indicating one or more levels of threat. For the purpose of illustration and not limitation, amber or yellow may indicate a caution alert, red may indicate a warning alert, and green or cyan may indicate a non-alert.

The aural advisory unit 144 may be any unit capable of producing aural advisories. Aural advisories may be discrete sounds, tones, and/or verbal statements used to annunciate a condition, situation, or event. Examples of aural advisories are provided below. In some embodiments, both aural advisories could be presented in combination with or simultaneous to visual alerts and/or tactile advisories.

The tactile advisory unit 146 may be any unit capable of producing tactile advisories. Tactile advisories may be any tactile stimulus to present a condition, situation, or event to the pilot such as, but not limited to, a warning alert and/or a caution alert. Examples of tactile stimuli include a "stick shaker" and a vibrating seat (e.g., a pilot's seat outfitted with a vibrating device). Moreover, tactile advisories could be presented in combination with or simultaneous to visual alerts and/or aural advisories. In some embodiments, one or more units of the presentation system 140 may receive presentation data provided by IG 130.

The visual display unit 142 may be configured to present one or more display(s) or image(s). In some embodiments, the terms "display" and "image" are interchangeable and treated synonymously.

Figure 2A:
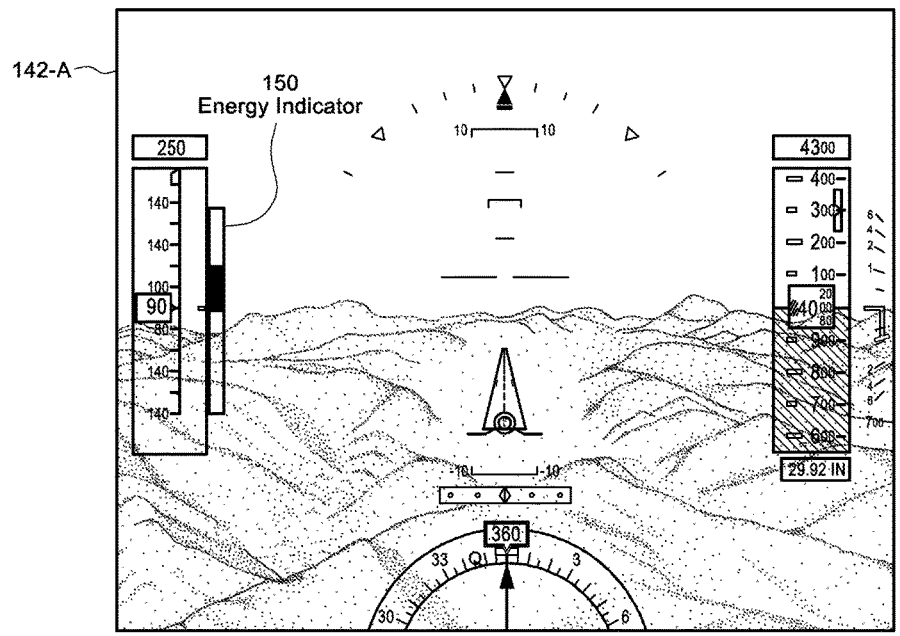
FIG. 2A presents an exemplary illustration of an energy indicator presented on a Head-Down Display unit.
Figure 2B:
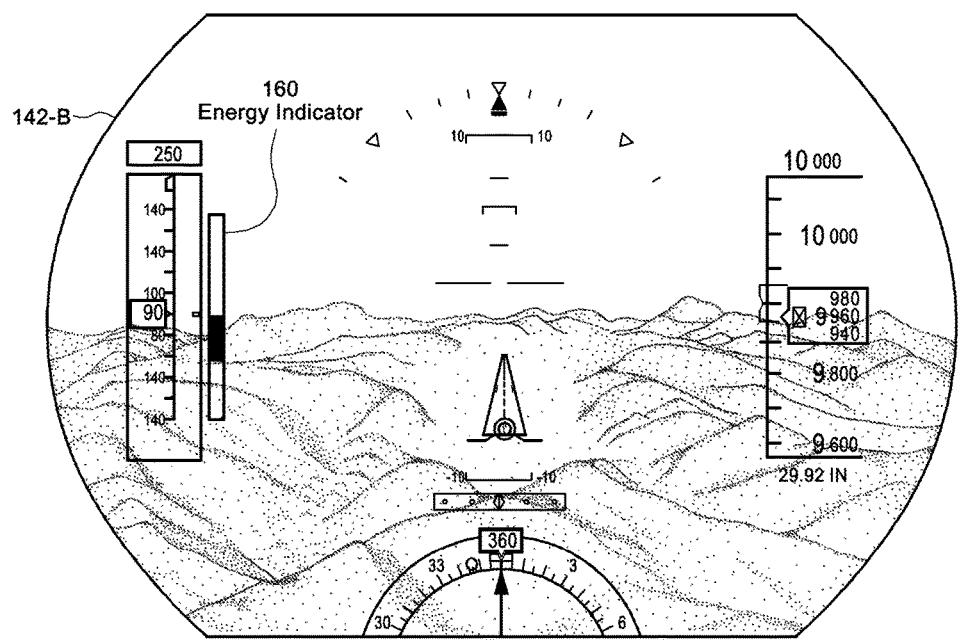
FIG. 2B presents an exemplary illustration of an energy indicator presented on a Head-Up Display unit.

Referring now to FIG. 2A, an exemplary depiction of a visual display unit 142-A comprised of an HDD has been configured to present tactical information to the pilot or flight crew against the background of a three-dimensional image of terrain and sky. FIG. 2B provides an exemplary depiction of a visual display unit 142-A comprised of a HUD unit for presenting tactical information to the pilot or flight crew against the background of a three-dimensional image of terrain and sky. Both the HDD unit and HUD unit could be employed as display units configured to present SVS image(s), EVS image(s), or combined SVS-EVS image(s). It should be noted that the tactical information depicted on the HDD unit and/or HUD unit has been made minimal for the sake of presentation and is not indicative of the plurality of indications or information with which it may be configured. Because the indications or information shown in FIGS. 2A and 2B are well-known to those skilled in the art, a discussion of the specific tactical information shown on them is not provided herein.

Figure 3B:
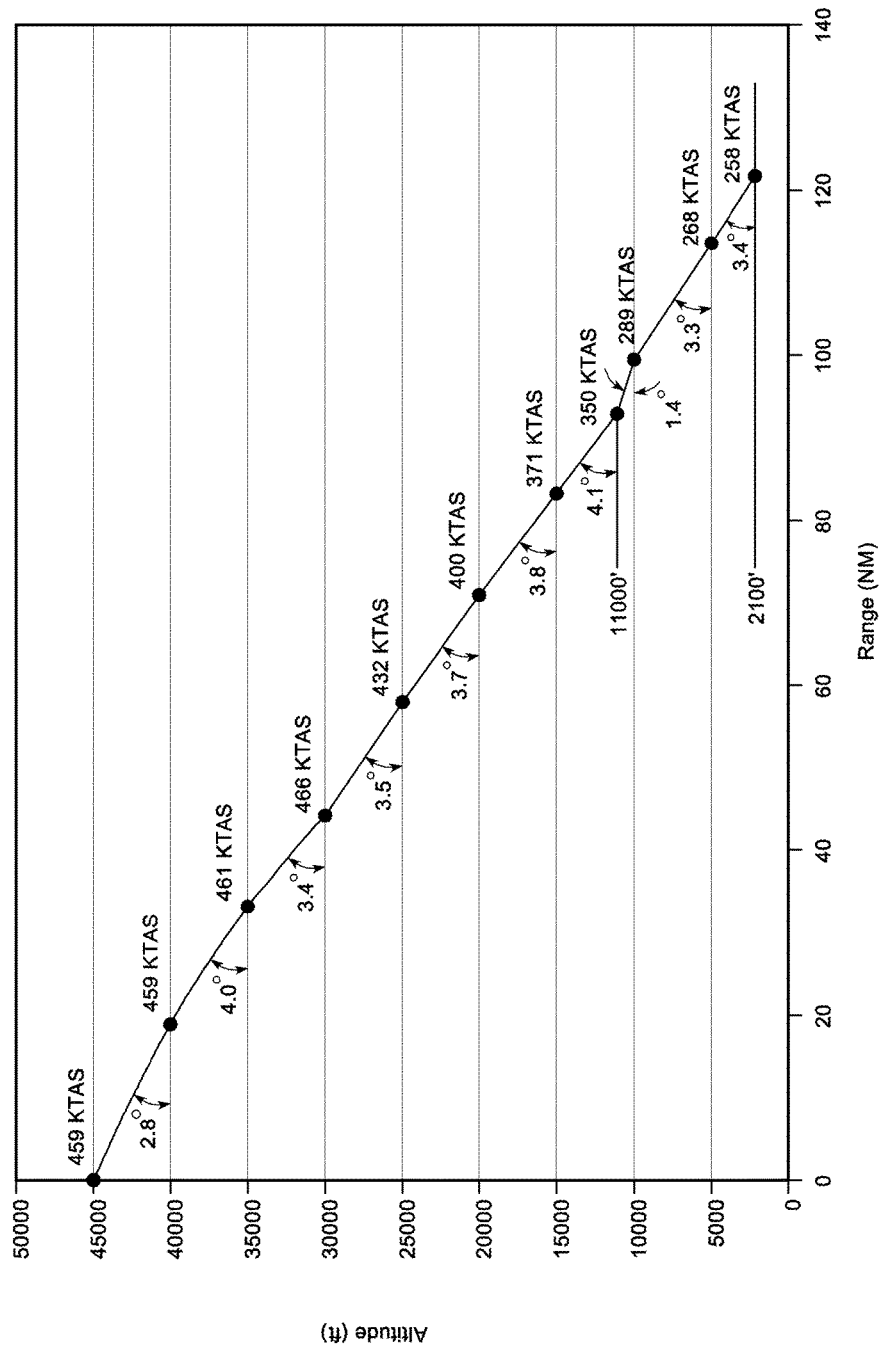
FIG. 3B illustrates a hypothetical FID path.

In addition, energy indicators 150 and 160 that are disclosed herein are presented on the visual display units 142 of FIGS. 2A and 2B, respectively. The location for presenting the energy indictor 150 is configurable by a manufacturer and/or end-user. In FIGS. 3A and 3B, the energy indictors 150 and 160 have been located in between the airspeed indicator and either the attitude indicator or altitude indicator of an image presented on the visual display unit 142 that has been configured for presenting tactical information. In some embodiments, a manufacturer and/or end-user could configure the energy indicator for another location within the same image or within another image other than one presenting tactical flight information. Also, although the orientation of the energy indicators 150 and 160 are vertically-disposed, the orientation is not limited to this disposition but includes other orientations that may be preferable to the manufacturer and/or end-user such as, but not limited to, a horizontally-disposed energy indicator.

Some advantages and benefits of embodiments discussed herein are shown in FIGS. 3A through 7B by illustrating how a flight idle descent (FID) path may be used to generate more than one energy indictor and enhance situational awareness by informing the pilot of whether there exists an excess or deficiency of energy along the FID path. As discussed above, the FID path could be employed by utilizing predictive atmospheric conditions, and the physical performance of the aircraft may be employed by an FID algorithm(s) to determine an ideal descent path that may never require the aircraft's throttles to move above idle and never require the intervention of a pilot to impart additional drag or engine thrust.

For the sole purpose of illustration, it will be assumed that a hypothetical FID algorithm has been applied for a hypothetical aircraft. Partial hypothetical results are shown in table of FIG. 3A under the columns of altitude, range, true airspeed (KTAS) in knots, weight, and vertical path angle (VPA). Known to those skilled in the art, energy algorithms have been applied to the results of the FID algorithm to produce a target kinetic energy (KE), target potential energy (PE), and target total energy (TE) corresponding to the FID path. KE has been determined as a function of at least square of speed, PE has been determined as a function of at least altitude, and TE has been determined as the sum of these two energies.

FIG. 3B illustrates a hypothetical FID path generated from data contained in the table of FIG. 3A, where the range and altitude are not drawn to scale. As observed, the speeds are not constant, and there is a gradual deceleration from 466 KTAS beginning from the altitude of 30,000 feet. Also, the VPA is not constant, a distinguishable characteristic of descent paths from which a constant angle is assumed.

Figure 3C:
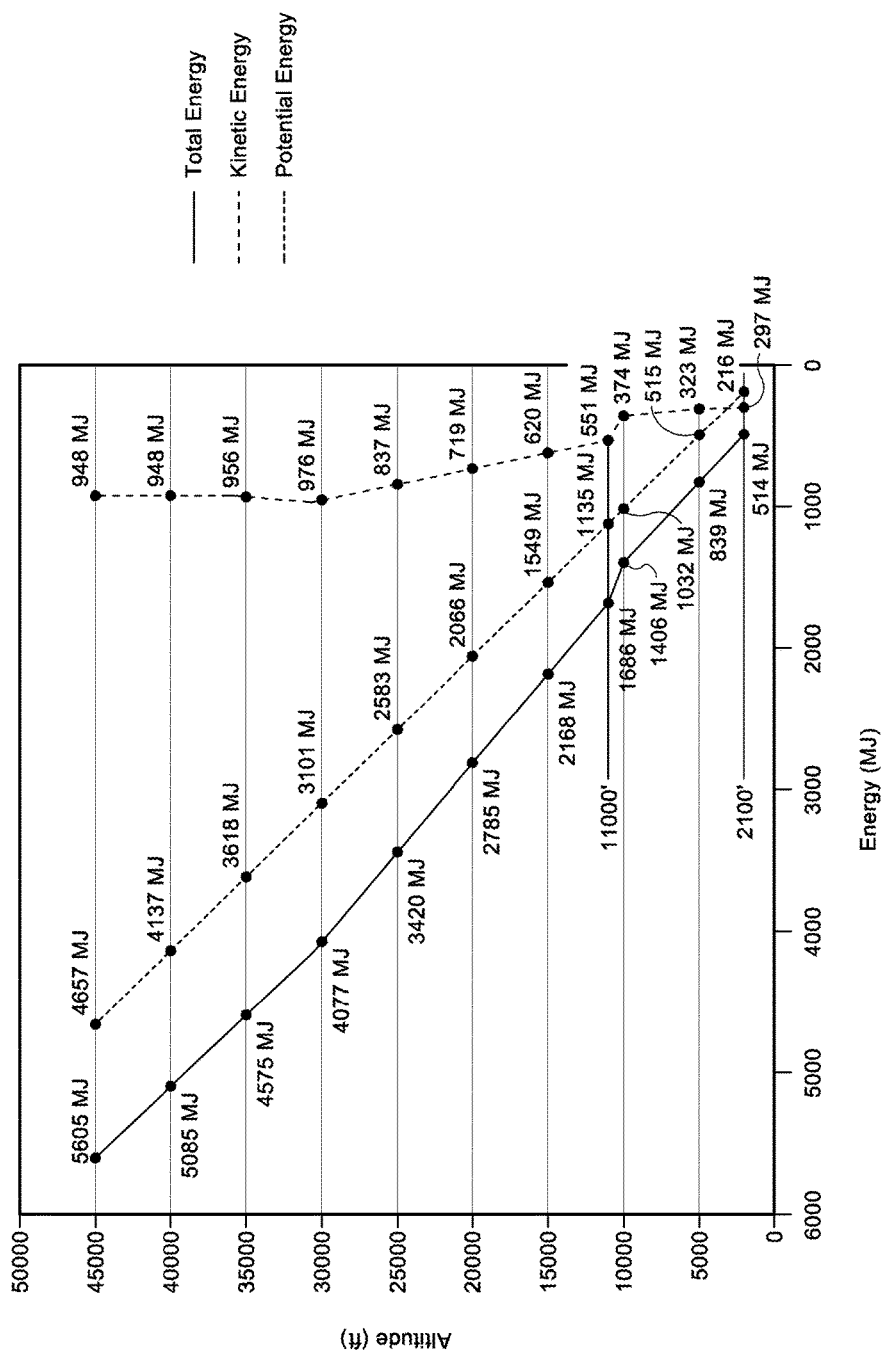
FIG. 3C illustrates a graph and plots of target energies.

FIG. 3C illustrates a graph in which the target KE, target PE, and target TE have been plotted. As expected from the data in the table, target KE as a function of speed, and target PE varies as a function of altitude.

Figure 4B:
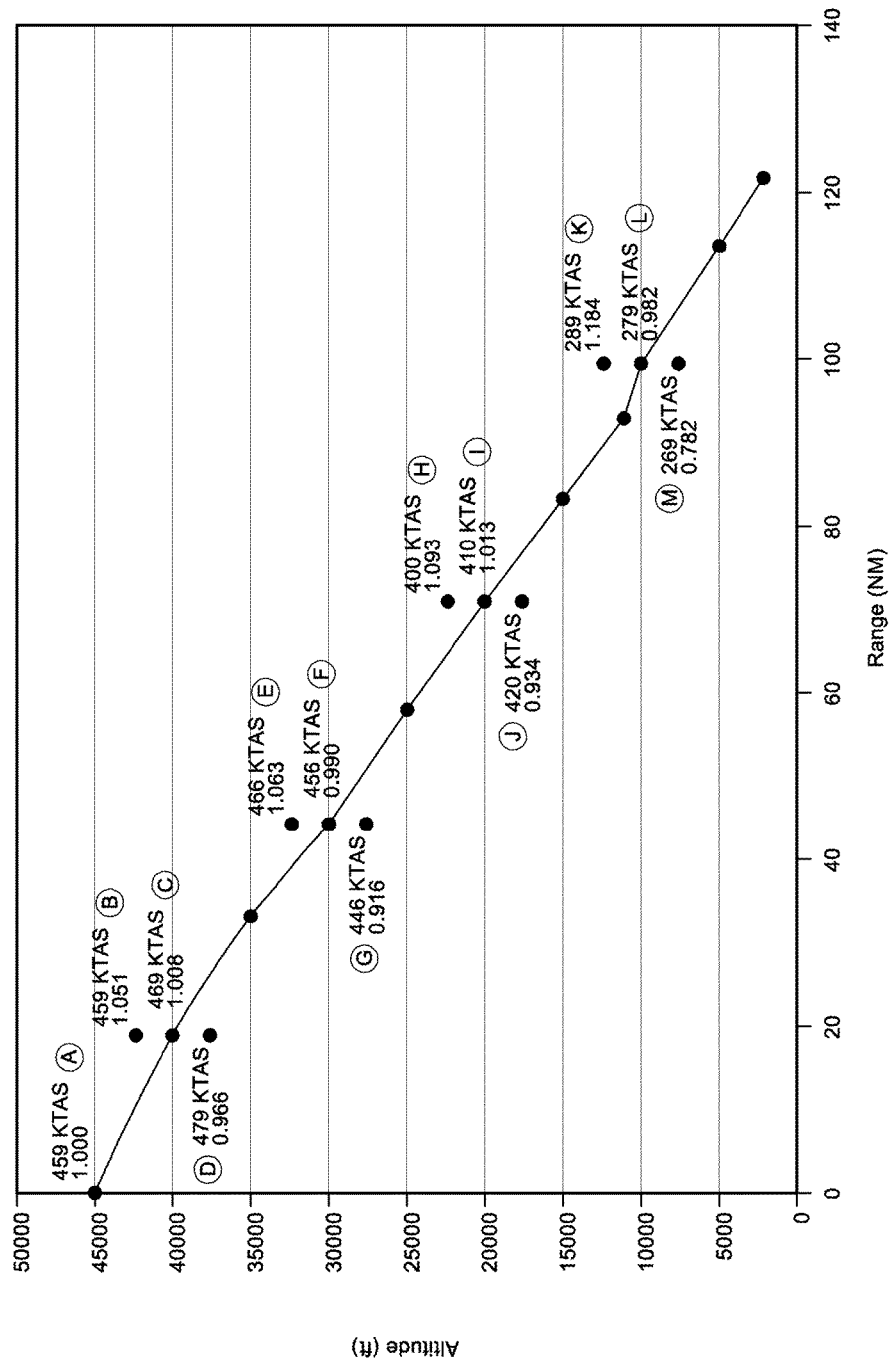
FIG. 4B illustrates a graph plotting the data contained in the table of FIG. 5A.

Referring to FIGS. 4A and 4B, the effect that actual altitude and actual speed have on PE, KE, and TE is illustrated. From the table of FIG. 3A, the target KTAS for the FID path at a range of 18.8 NM (nautical miles) at 40,000 feet is 459 knots. As shown in row A of FIG. 4A, the actual KTAS and the actual altitude at the range of 18.8 NM are the same as the target VTAS and target altitude for the range. The actual KE, actual PE, and actual TE at the range are 948 Mega Joules (MJ), 4,657 MJ and 5,604 MJ, respectively, the same as the respective target KE, target PE, and target TE. The TE ratio (a ratio of actual TE to target TE) and corresponding TE percentage are 1.000 and 0.0, respectively, as shown in row A.

FIG. 4B illustrates a graph in which TE ratios and actual KTAS are shown with the FID path. As observed, the TE ratio of 1.000 and the actual KTAS of 459 KTAS are shown at the actual altitude of 40,000 and range of 18.8 NM.

As shown in row B of FIG. 4A, the actual KTAS at the range of 18.8 NM is the same as the target VTAS of 459 knots for the range, but the actual altitude is 42,500 feet, 2,500 feet above the target altitude. The higher altitude is also illustrated by comparing the actual PE of 4,395 MJ with the target PE of 4,137 MJ, an excess of both PE and TE of 258 MJ (the KE is unchanged for this KTAS and range). The TE ratio and corresponding TE percentage are 1.051 and 5.1, respectively, as shown in row B. As shown in FIG. 4B, the TE ratio and the actual KTAS are shown at the actual altitude and range.

As shown in row C of FIG. 4A, the actual altitude of 40,000 feet at the range of 18.8 NM is the same as the target altitude of 40,000 feet for the range, but the actual KTAS is 469 knots, 10 knots above the target KTAS. The higher KTAS is also illustrated by comparing the actual KE of 990 MJ with the target KE of 948 MJ, an excess of both KE and KE of 42 MJ (the PE is unchanged for this altitude and range). The TE ratio and corresponding TE percentage are 1.008 and 0.8, respectively, as shown in row C. As shown in FIG. 4B, the TE ratio and the actual KTAS are shown at the actual altitude and range.

As shown in row D of FIG. 4A, the actual altitude at the range of 18.8 NM is 37,500 feet, 2,500 feet below the target altitude for the range. Also, the actual KTAS at the range is 479 knots, 20 knots above the target KTAS. The lower altitude is illustrated by comparing the actual PE of 3,879 MJ with the target PE of 4,137 MJ, a deficiency of PE of 258 MJ. The higher KTAS is illustrated by comparing the actual KE of 1032 MJ with the target KE of 948 MJ, an excess of KE of 84 MJ. The actual TE at the range is 4,911 MJ, a deficiency of TE of 174 MJ when compared with the target TE of 5,085 MJ. The TE ratio and corresponding TE percentage are 0.966 and −3.4, respectively, as shown in row D. As shown in FIG. 4B, the TE ratio and the actual KTAS are shown at the actual altitude and range.

As shown in rows E through M of the table of FIG. 4A, combinations of actual altitudes and actual KTASs are shown for ranges of 44.3 NM, 70.9 NM, and 99.2 NM. For each of these combinations, the values of the TE ratios and corresponding TE percentages are shown. As observed in FIG. 4B, these TE ratios and actual KTASs are shown with the FID path.

Figure 4C:
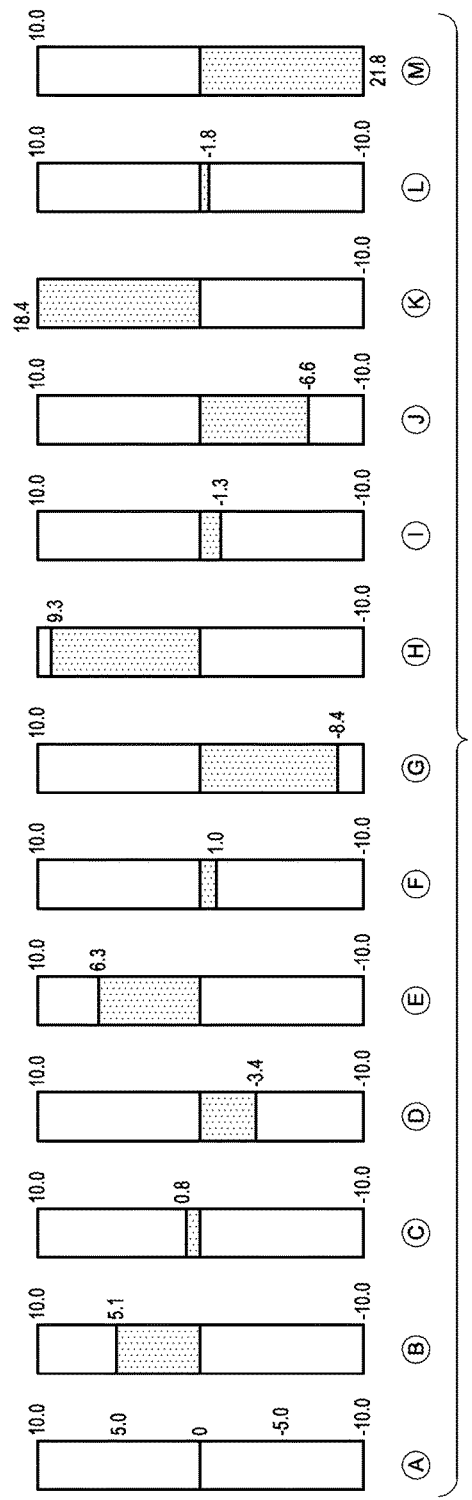
FIG. 4C illustrates energy indicators scaled to total energy ratios.

Referring to FIG. 4C, a plurality of energy indicators A through M corresponding to the rows of data in the table shown in FIG. 4A is illustrated. As observed in FIG. 4C, each indicator is comprised of a reference position (indicated by 0), a minimum position (indicated by −10.0), and a maximum position (indicated by 10.0), where the reference, minimum, and maximum positions may be correlated to TE percentages of 0.0, −10.0, and 10.0. In addition, the energy indicator could be further comprised of a variably-sized bar, the size of which varies with a target TE deviation, that is, the deviation of an actual TE from a target TE. As such, the excess or deficiency of TE correlating to the FID path may be graphically presented to the pilot; a relatively small-sized bar may indicate the need for a minimal amount of manual intervention, whereas a relatively large-sized bar may indicate the need for an aggressive amount of manual intervention.

Energy indicator A of FIG. 4C is indicative of the target TE deviation for TE shown row A of FIG. 4A; the TE percentage of row A is 0.0, corresponding to a target TE deviation of 0.0 as shown in energy indicator A. Energy indicator B is indicative of the target TE deviation for TE shown in row B; the TE percentage of row B is 5.1, corresponding to a target TE deviation of 5.1 as shown by the size of the bar in energy indicator B. Energy indicator C is indicative of the target TE deviation for TE shown in row C; the TE percentage of row C is 0.8, corresponding to a target TE deviation of 0.8 shown by the size of the bar in energy indicator C. Energy indicator D is indicative of the target TE deviation for TE shown in row D; the TE percentage of row D is −3.4, corresponding to a target TE deviation of −3.4 shown by the size of the bar in energy indicator D. For the remaining energy indicators E through M, each is indicative of the target TE deviation shown in rows E through M, respectively; each TE deviation corresponding to one of the TE percentages of the rows is indicated by the size of the bar shown in its respective energy indicator of FIG. 4C. It should be noted that, although numerical indications have been included in the energy indicators A through M, some or all of them could be excluded from being presented.

Referring to energy indicators K and M of FIG. 4C, the TE percentages of rows K and M exceed the indicator's maximum and minimum TE deviations, respectively. In these cases, the size of the bars have reached a maximum size. In such instances, a manufacture and/or end-user provide one or more alerts produced via the aural advisory unit 144 and/or tactile advisory unit 146. For example, the bar could be configured to change color and/or flash, textual and/or aural indications could be presented, and/or a stick shaker or seat vibrating device could be activated to draw the pilot's attention to an unwanted or undesirable situation in need of immediate intervention.

In some embodiments, the maximum and minimum deviations indicated by the energy indictor could correlate to maximum altitude deviations from a target altitude. From the preceding discussion, the target KTAS for the target altitude of 40,000 feet and range of 18.8 NM is 459 knots. Referring to FIG. 5A, the maximum deviation from the target altitude for a given range is assumed to equal 500 feet. For the target altitude of 40,000 feet, the maximum deviations correspond to actual altitudes of 40,500 and 39,500 feet. As shown in the left-hand table of FIG. 5A, the actual TE for each of these actual altitudes is 5,137 MJ and 5,033 MJ, respectively. From the actual TEs, the maximum position (indicated by +1.0) on the energy indicator could correlate to 5,137 MJ, the reference position (indicated by 0.0) to 5,085 MJ, and the minimum position (indicated by −1.0) to 5,033 MJ. For the target altitudes of 5,000 feet to 35,000 feet and incremented by 5,000 feet intervals, the maximum deviations of altitudes of 500 feet above and below the target altitude are shown in the left-hand table. From these TEs, correlated maximum, reference, and minimum positions for the energy indicator are provided in the upper table.

FIG. 5A provides two examples to illustrate how the height of the bar of the energy indicator may be determined, for example, through interpolation. In Example 1, it is assumed that the actual TE for the aircraft flying at an altitude of 20,000 feet is 2,800 MJ. From the top table, the actual TE corresponding to the maximum deviation of the target altitude of 20,000 feet is 2,836 MJ, and the target TE is 2,785 MJ. After interpolation, the height of the bar has been determined to be +0.29 as shown. Likewise, in Example 2, it is assumed that the actual TE for the aircraft flying at an altitude of 30,000 feet is 4,035 MJ. From the top table, the actual TE corresponding to the maximum deviation of the target altitude of 30,000 feet is 4,025 MJ, and the target TE is 4,077 MJ. After interpolation, the height of the bar has been determined to be −0.81 as shown.

Figure 5B:
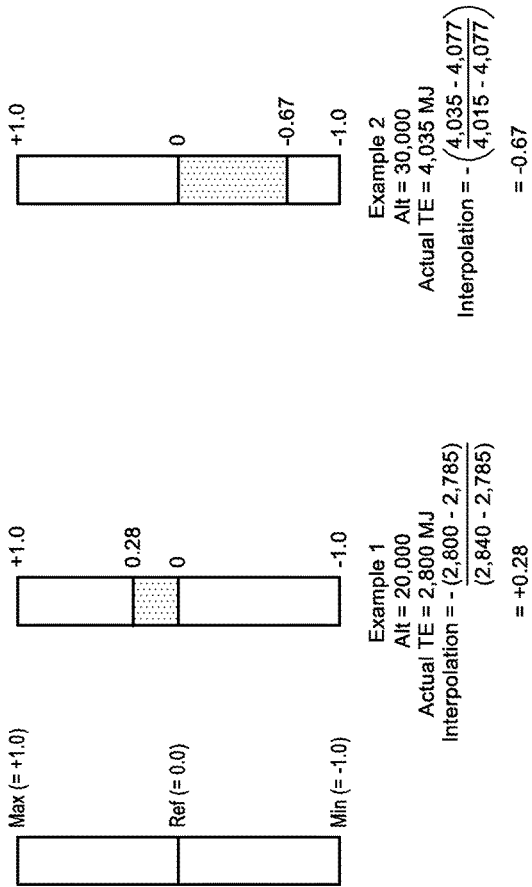
FIG. 5B illustrates maximum and minimum deviations of an energy indictor correlated to maximum speed deviations.

In some embodiments, the maximum and minimum deviations indicated by the energy indictor could correlate to maximum speed deviations from a target KTAS. From the preceding discussion, the target altitude for the target KTAS of 459 knots and range of 18.8 NM is 40,000 feet. Referring to FIG. 5B, the maximum deviation from the target KTAS for a given range is assumed to equal 15 knots. For the target KTAS of 459 knots, the maximum deviations correspond to actual KTASs of 474 and 444 knots. As shown in the left-hand table of FIG. 5B, the actual TE for each of these actual KTASs is 5,148 MJ and 5,024 MJ, respectively. From the actual TEs, the maximum position on the energy indicator could correlate to 5,148 MJ, the reference position to 5,085 MJ, and the minimum position to 5,024 MJ. For the target KTASs corresponding to target altitudes of 5,000 feet to 35,000 feet and incremented by 5,000 feet intervals, the maximum deviations of KTASs of 15 knots feet above and below the target KTAS are shown in the left-hand table. From these TEs, correlated maximum, reference, and minimum positions for the energy indicator are provided in the upper table.

Similar to the examples of FIG. 5A, two examples are provided in FIG. 5B to illustrate how the height of the bar of the energy indicator may be determined, for example, through interpolation. In Example 1, it is again assumed that the actual TE for the aircraft flying at an altitude of 20,000 feet is 2,800 MJ. From the top table, the actual TE corresponding to the maximum deviation of the target altitude of 20,000 feet is 2,840 MJ, and the target TE is 2,785 MJ. After interpolation, the height of the bar has been determined to be +0.28 as shown. In Example 2, it is again assumed that the actual TE for the aircraft flying at an altitude of 30,000 feet is 4,035 MJ. From the top table, the actual TE corresponding to the maximum deviation of the target altitude of 30,000 feet is 4,015 MJ, and the target TE is 4,077 MJ. After interpolation, the height of the bar has been determined to be −0.67 as shown.

Figure 5C:
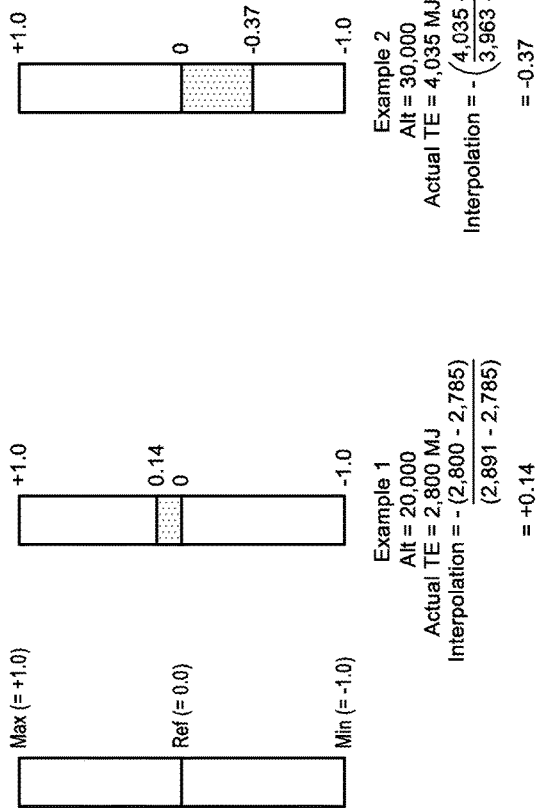
FIG. 5C illustrates maximum and minimum deviations of an energy indictor correlated to maximum altitude deviations and maximum speed deviations.

In some embodiments, the maximum and minimum deviations indicated by the energy indictor could correlate to both maximum altitude deviations and maximum speed deviations from a target altitude and KTAS, respectively. From the preceding discussion, the target altitude is 40,000 feet and for the target KTAS of 459 knots for a range of 18.8 NM. Referring to FIG. 5C, the maximum deviation from the target altitude for a given range is assumed to equal 500 feet, and the maximum deviation from the target KTAS is assumed to equal 15 knots. For the target altitude of 40,000 feet, the maximum deviations correspond to actual altitudes of 40,500 and 39,500 feet; for the target KTAS of 459 knots, the maximum deviations correspond to actual KTASs of 474 and 444 knots. As shown in a tables of FIG. 5C, the actual TE for each of the actual altitude of 40,500 and actual KTAS of 444 is 5,199 MJ, and the actual TE for each of the actual altitude of 39,500 and actual KTAS of 474 is 4,972 MJ. From these actual TEs, the maximum position on the energy indicator could correlate to 5,199 MJ, the reference position to 5,085 MJ, and the minimum position to 4,972 MJ. For the target altitudes and target KTASs corresponding to target altitudes of 5,000 feet to 35,000 feet and incremented by 5,000 feet intervals, the maximum deviations of altitudes of 500 feet above and below the target altitude and KTASs of 15 knots feet above and below the target KTAS are shown in the left-hand table. From these TEs, correlated maximum, reference, and minimum positions for the energy indicator are provided in the upper table.

Similar to the examples of FIGS. 5A and 5B, two examples are provided in FIG. 5C to illustrate how the height of the bar of the energy indicator may be determined, for example, through interpolation. In Example 1, it is again assumed that the actual TE for the aircraft flying at an altitude of 20,000 feet is 2,800 MJ. From the top table, the actual TE corresponding to the maximum deviation of the target altitude of 20,000 feet is 2,891 MJ, and the target TE is 2,785 MJ. After interpolation, the height of the bar has been determined to be +0.14 as shown. In Example 2, it is again assumed that the actual TE for the aircraft flying at an altitude of 30,000 feet is 4,035 MJ. From the top table, the actual TE corresponding to the maximum deviation of the target altitude of 30,000 feet is 3,963 MJ, and the target TE is 4,077 MJ. After interpolation, the height of the bar has been determined to be −0.37 as shown.

As discussed above, the target KTAS for the FID path at a range of 18.8 NM (nautical miles) at 40,000 feet is 459 knots. Referring to FIG. 6A, the actual KTAS and the actual altitude at the range of 18.8 NM shown in row N are the same as the target VTAS and target altitude for the range. The actual KE, actual PE, and actual TE at the range are 948 MJ, 4,657 MJ and 5,604 MJ, respectively, the same as the respective target KE, target PE, and target TE. The KE ratio (a ratio of actual KE to target KE) and corresponding KE percentage are 1.000 and 0.0 percent, respectively, as shown in row N. In addition, the PE ratio (a ratio of actual PE to target PE) and corresponding PE percentage are 1.000 and 0.0, respectively, as also shown in row N.

As shown in row O of FIG. 6A, the actual KTAS at the range of 18.8 NM is the same as the target VTAS of 459 knots for the range, but the actual altitude is 42,500 feet, 2,500 feet above the target altitude. The higher altitude is also illustrated by comparing the actual PE of 4,395 MJ with the target PE of 4,137 MJ, an excess of both PE and TE of 258 MJ (the KE is unchanged for this KTAS and range). The PE ratio and corresponding PE percentage are 1.062 and 6.2, respectively, as shown in row O.

As shown in row P of FIG. 6A, the actual altitude of 40,000 feet at the range of 18.8 NM is the same as the target altitude of 40,000 feet for the range, but the actual KTAS is 469 knots, 10 knots above the target KTAS. The higher KTAS is also illustrated by comparing the actual KE of 990 MJ with the target KE of 948 MJ, an excess of both KE and KE of 42 MJ (the PE is unchanged for this altitude and range). The KE ratio and corresponding KE percentage are 1.044 and 4.4, respectively, as shown in row P.

As shown in row Q of FIG. 6A, the actual altitude at the range of 18.8 NM is 37,500 feet, 2,500 feet below the target altitude for the range. Also, the actual KTAS at the range is 479 knots, 20 knots above the target KTAS. The lower altitude is illustrated by comparing the actual PE of 3,879 MJ with the target PE of 4,137 MJ, a deficiency of PE of 258 MJ. The higher KTAS is illustrated by comparing the actual KE of 1032 MJ with the target KE of 948 MJ, an excess of KE of 84 MJ. The PE ratio and corresponding PE percentage are 0.937 and −6.3, respectively, as shown in row Q. The KE ratio and corresponding KE percentage are 1.089 and 8.9, respectively, as also shown in row Q.

As shown in rows R through Z of the table of FIG. 6A, combinations of actual altitudes and actual KTASs are shown for ranges of 44.3 NM, 70.9 NM, and 99.2 NM. For each of these combinations, the values of the PE ratios and corresponding PE percentages as well as the values of the KE ratios and corresponding KE percentages are shown.

Figure 6B:
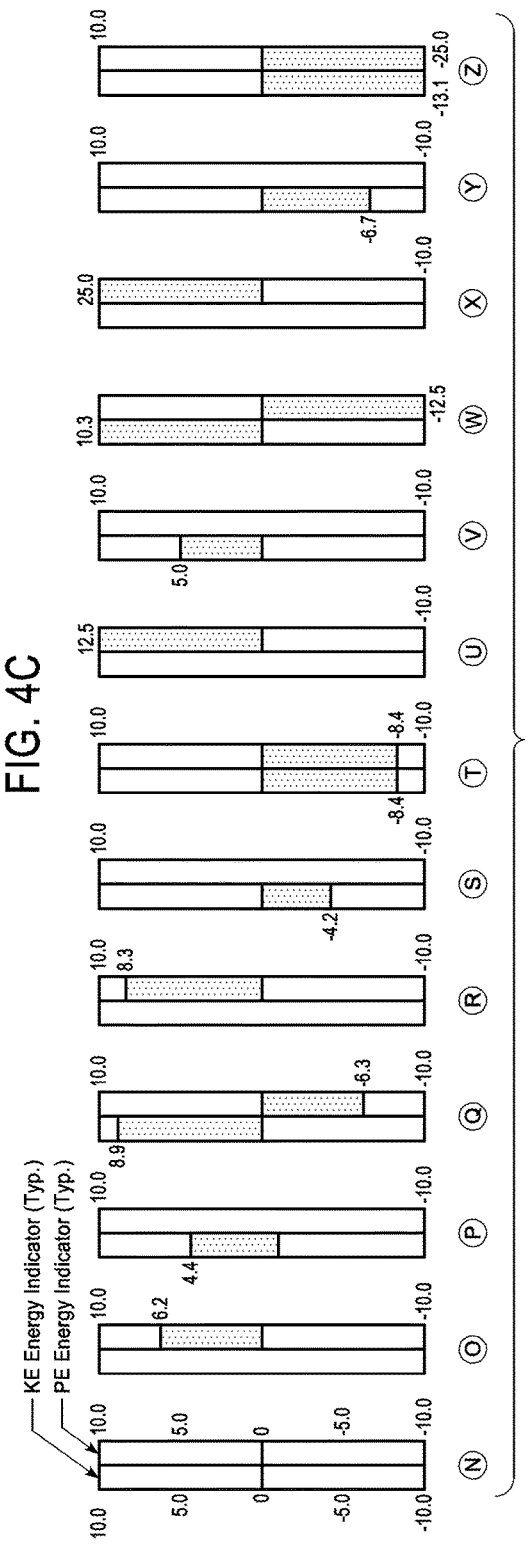
FIG. 6B illustrates energy indicators scaled to kinetic and potential energy ratios.

Referring to FIG. 6B, a plurality of energy indicators N through Z corresponding to the rows of data in the table shown in FIG. 6A is illustrated. As observed in FIG. 6B, each N though Z indicator may be comprised of separate KE and PE indicators, each being comprised of a reference position (indicated by 0), a minimum position (indicated by −10.0), and a maximum position (indicated by 10.0); the reference, minimum, and maximum positions for both the KE and PE indicators may be correlated to KE and PE percentages of 0.0, −10.0, and 10.0, respectively. In addition, each KE and PE energy indicator could be further comprised of a variably-sized bar, the size of which varies with a target KE and PE deviation. As such, the excess or deficiency of KE and PE correlating to the FID path may be graphically presented to the pilot.

The KE energy indicator N of FIG. 6B is indicative of the target KE deviation for KE shown row N of FIG. 6A; the KE percentage of row N is 0.0, corresponding to a target KE deviation of 0.0 as shown in KE energy indicator N. The PE energy indicator N of FIG. 6B is indicative of the target PE deviation for PE shown row N of FIG. 6A; the PE percentage of row N is 0.0, corresponding to a target PE deviation of 0.0 as shown in PE energy indicator N.

The KE energy indicator O is indicative of the target KE deviation for KE shown in row P; the KE percentage of row O is 0.0, corresponding to a target KE deviation of 0.0 as shown by the size of the bar in KE energy indicator O. The PE energy indicator O of FIG. 6B is indicative of the target PE deviation for PE shown row O of FIG. 6A; the PE percentage of row O is 6.2, corresponding to a target PE deviation of 6.2 as shown in PE energy indicator O.

The KE energy indicator P is indicative of the target KE deviation for KE shown in row P; the KE percentage of row P is 4.4, corresponding to a target KE deviation of 4.4 as shown by the size of the bar in KE energy indicator P. The PE energy indicator P of FIG. 6B is indicative of the target PE deviation for PE shown row P of FIG. 6A; the PE percentage of row P is 0.0, corresponding to a target PE deviation of 0.0 as shown in PE energy indicator N.

The KE energy indicator Q is indicative of the target KE deviation for KE shown in row Q; the KE percentage of row Q is 8.9, corresponding to a target KE deviation of 8.9 as shown by the size of the bar in KE energy indicator Q. The PE energy indicator Q of FIG. 6B is indicative of the target PE deviation for PE shown row Q of FIG. 6A; the PE percentage of row Q is −6.3, corresponding to a target PE deviation of −6.3 as shown in PE energy indicator Q.

For the remaining KE and PE energy indicators R through Z, each is indicative of the target KE and PE deviations shown in rows R through Z, respectively; each KE and PE deviation corresponding to one of the KE and PE percentages of the rows is indicated by the size of the bar shown in its respective KE and PE energy indicator of FIG. 6B. It should be noted that, although numerical indications have been included in the energy indicators N through Z, some or all of them could be excluded from being presented.

Figure 7B:
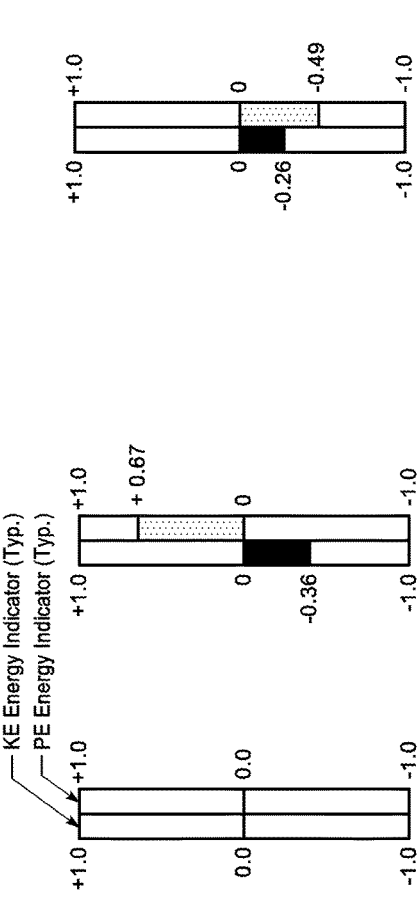
FIG. 7B illustrates maximum and minimum deviations of an energy indictor correlated to maximum altitude deviations.

As stated above, the maximum and minimum deviations indicated by the energy indictor could correlate to maximum speed deviations from a target KTAS in some embodiments. From the preceding discussion, the target altitude for the target KTAS of 459 knots and range of 18.8 NM is 40,000 feet. Referring to FIG. 7A, the maximum deviation from the target KTAS for a given range is assumed to equal 15 knots. For the target KTAS of 459 knots, the maximum deviations correspond to actual KTASs of 474 and 444 knots. As shown in the left-hand table of FIG. 7A, the actual KE for each of these actual KTASs is 1,011 MJ and 887 MJ, respectively. From the actual KEs, the maximum position on the KE energy indicator shown in FIG. 7B and indicated by +1.0 could correlate to 1,011 MJ, the reference position (indicated by 0.0) to 948 MJ, and the minimum position (indicated by −1.0) to 887 MJ. For the target KTASs corresponding to target altitudes of 5,000 feet to 35,000 feet and incremented by 5,000 feet intervals, the maximum deviations of KTASs of 15 knots feet above and below the target KTAS are shown in the left-hand table. From these KEs, correlated maximum, reference, and minimum positions for the KE energy indicator are provided in the right-hand table.

As stated above, the maximum and minimum deviations indicated by the energy indictor could correlate to maximum altitude deviations from a target altitude in some embodiments. From the preceding discussion, the target KTAS for the target altitude of 40,000 feet and range of 18.8 NM is 459 knots. Referring to FIG. 7B, the maximum deviation from the target altitude for a given range is assumed to equal 500 feet. For the target altitude of 40,000 feet, the maximum deviations correspond to actual altitudes of 40,500 and 39,500 feet. As shown in the left-hand table of FIG. 7B, the actual PE for each of these actual altitudes is 4,189 MJ and 4,085 MJ, respectively. From the actual PEs of FIG. 7B, the maximum position on the PE energy indicator (indicated by +1.0) could correlate to 4,189 MJ, the reference position (indicated by 0.0) to 4,137 MJ, and the minimum position (indicated by −1.0) to 4,085 MJ. For the target altitudes of 5,000 feet to 35,000 feet and incremented by 5,000 feet intervals, the maximum deviations of altitudes of 500 feet above and below the target altitude are shown in the left-hand table. From these PEs, correlated maximum, reference, and minimum positions for the PE energy indicator are provided in the upper table.

FIG. 7B provides two examples to illustrate how the height of the bar of both the KE and PE energy indicators may be determined, for example, through interpolation. In Example 1, it is assumed that the actual KE for the aircraft flying at an altitude of 20,000 feet is 700 MJ and the actual PE is 2,100 MJ. From the right-hand table of FIG. 7A, the actual KE corresponding to the maximum deviation of the target altitude of 20,000 feet is 666 MJ, and the target KE is 719 MJ; after interpolation, the height of the bar for the KE energy indicator has been determined to be −0.36 as shown. From the upper table of FIG. 7B, the actual PE corresponding to the maximum deviation of the target altitude of 20,000 feet is 2,117 MJ, and the target KE is 2,066 MJ; after interpolation, the height of the bar for the PE energy indicator has been determined to be +0.67 as shown.

Likewise, in Example 2, it is assumed that the actual KE for the aircraft flying at an altitude of 30,000 feet is 960 MJ and the actual PE is 3,075 MJ. From the right-hand table of FIG. 7A, the actual KE corresponding to the maximum deviation of the target altitude of 30,000 feet is 914 MJ, and the target KE is 976 MJ; after interpolation, the height of the bar for the KE energy indicator has been determined to be −0.26 as shown. From the upper table of FIG. 7B, the actual PE corresponding to the maximum deviation of the target altitude of 30,000 feet is 3,049 MJ, and the target KE is 3,101 MJ; after interpolation, the height of the bar for the PE energy indicator has been determined to be −0.49 as shown.

Similar to the examples of FIG. 5A, two examples are provided in FIG. 5B to illustrate how the height of the bar of the energy indicator may be determined, for example, through interpolation. In Example 1, it is again assumed that the actual TE for the aircraft flying at an altitude of 20,000 feet is 2,800 MJ. From the top table, the actual TE corresponding to the maximum deviation of the target altitude of 20,000 feet is 2,840 MJ, and the target TE is 2,785 MJ. After interpolation, the height of the bar has been determined to be +0.28 as shown. In Example 2, it is again assumed that the actual TE for the aircraft flying at an altitude of 30,000 feet is 4,035 MJ. From the top table, the actual TE corresponding to the maximum deviation of the target altitude of 30,000 feet is 4,015 MJ, and the target TE is 4,077 MJ. After interpolation, the height of the bar has been determined to be −0.67 as shown.

In some embodiments, the maximum and minimum deviations indicated by the energy indictor could correlate to both maximum altitude deviations and maximum speed deviations from a target altitude and KTAS, respectively. From the preceding discussion, the target altitude is 40,000 feet and for the target KTAS of 459 knots for a range of 18.8 NM. Referring to FIG. 5C, the maximum deviation from the target altitude for a given range is assumed to equal 500 feet, and the maximum deviation from the target KTAS is assumed to equal 15 knots. For the target altitude of 40,000 feet, the maximum deviations correspond to actual altitudes of 40,500 and 39,500 feet; for the target KTAS of 459 knots, the maximum deviations correspond to actual KTASs of 474 and 444 knots. As shown in a tables of FIG. 5C, the actual TE for each of the actual altitude of 40,500 and actual KTAS of 444 is 5,199 MJ, and the actual TE for each of the actual altitude of 39,500 and actual KTAS of 474 is 4,972 MJ. From these actual TEs, the maximum position on the energy indicator could correlate to 5,199 MJ, the reference position to 5,085 MJ, and the minimum position to 4,972 MJ. For the target altitudes and target KTASs corresponding to target altitudes of 5,000 feet to 35,000 feet and incremented by 5,000 feet intervals, the maximum deviations of altitudes of 500 feet above and below the target altitude and KTASs of 15 knots feet above and below the target KTAS are shown in the left-hand table. From these TEs, correlated maximum, reference, and minimum positions for the energy indicator are provided in the upper table.

Similar to the examples of FIGS. 5A and 5B, two examples are provided in FIG. 5C to illustrate how the height of the bar of the energy indicator may be determined, for example, through interpolation. In Example 1, it is again assumed that the actual TE for the aircraft flying at an altitude of 20,000 feet is 2,800 MJ. From the top table, the actual TE corresponding to the maximum deviation of the target altitude of 20,000 feet is 2,891 MJ, and the target TE is 2,785 MJ. After interpolation, the height of the bar has been determined to be +0.14 as shown. In Example 2, it is again assumed that the actual TE for the aircraft flying at an altitude of 30,000 feet is 4,035 MJ. From the top table, the actual TE corresponding to the maximum deviation of the target altitude of 30,000 feet is 3,963 MJ, and the target TE is 4,077 MJ. After interpolation, the height of the bar has been determined to be −0.37 as shown.

Figure 8:
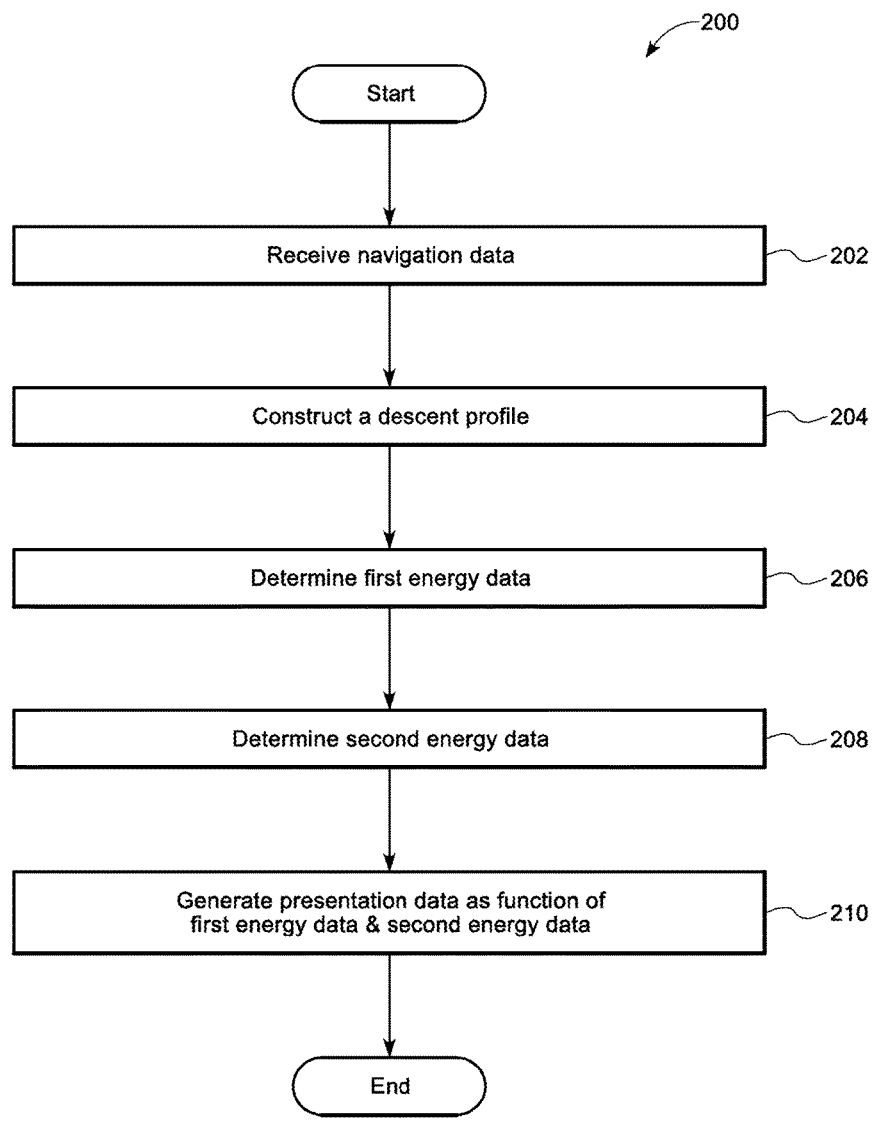
FIG. 8 illustrates a flowchart disclosing an embodiment of a method for generating an energy indicator.

FIG. 8 depicts flowchart 200 disclosing an example of a method for generating one or more energy indicators, where the IG 130 may be programmed or configured with instructions corresponding to the modules embodied in flowchart 200. In some embodiments, the IG 130 may be a processor or a combination of processors found in the presentation system 140 or any other system suitable for performing the task. Also, the IG 130 may be a processor of a module such as, but not limited to, a printed circuit card having one or more input interfaces to facilitate the two-way data communications of the IG 130, i.e., the receiving and providing of data. As necessary for the accomplishment of the following modules embodied in flowchart 200, the acquiring of data is synonymous and/or interchangeable with the receiving and/or retrieving of data, and the providing of data is synonymous and/or interchangeable with the making available or supplying of data.

The method of flowchart 200 begins with module 202 with the IG 130 acquiring of aircraft performance data representative of at least measurements of speed and altitude from the aircraft performance factor data source 120. In some embodiments, the navigation data source 110 may be included aircraft performance factor data source 120.

The flowchart 200 continues with module 204 with the IG 130 determining descent path data as a function of at least the aircraft performance data, where the descent path data may be representative of a descent path. In some embodiments, the descent path could be a FID path.

The flowchart 200 continues with module 206 with the IG 130 determining of first aircraft energy data as a function of at least the descent path data, where the first aircraft energy data may be representative of a measurement of reference aircraft energy. In some embodiments, the reference aircraft energy could be reference aircraft potential energy that could be a target potential energy. In some embodiments, the reference aircraft energy could be reference aircraft kinetic energy that could be a target kinetic energy. In some embodiments, the reference aircraft energy could be reference aircraft total energy that could be a target total energy. In some embodiments, the reference aircraft energy could be any combination of the preceding reference aircraft energies.

The flowchart 200 continues with module 208 with the IG 130 determining of second aircraft energy data as a function of at least the aircraft performance data, where the second aircraft energy data may be representative of a measurement of actual aircraft energy. In some embodiments, the actual aircraft energy could be actual aircraft potential energy. In some embodiments, the actual aircraft energy could be actual aircraft kinetic energy. In some embodiments, the actual aircraft energy could be actual aircraft total energy. In some embodiments, the actual aircraft energy could be any combination of the preceding actual aircraft energies.

The flowchart 200 continues with module 210 with the IG 130 generating of presentation data as a function of the first energy data and the second energy data. The presentation data may be representative of one or more images of aircraft energy indicators presentable to a viewer. In some embodiments, each image could indicate a deviation of actual aircraft energy from reference aircraft energy. In some embodiments, each presentation data could be further representative of an aural advisory and/or a tactile advisory. Then, the method of flowchart 200 ends.

It should be noted that the method steps described above may be embodied in computer-readable media stored in a non-transitory computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the inventive concepts disclosed herein. It is intended that all modifications, permutations, enhancements, equivalents, and improvements thereto that are apparent to those skilled in the art upon a reading of the specification and a study of the drawings are included within the true spirit and scope of the inventive concepts disclosed herein. It is therefore intended that the following appended claims include all such modifications, permutations, enhancements, equivalents, and improvements falling within the true spirit and scope of the inventive concepts disclosed herein.

What is claimed is:

1. A system for generating an aircraft energy indicator, comprising:
   at least one source of aircraft performance data; and
   an image generator configured to:
      acquire first aircraft performance data representative of at least first measurements of speed and altitude;
      determine descent path data representative of a descent path as a function of at least the first aircraft performance data;
      determine reference aircraft energy data as a function of at least the descent path data;
      acquire second aircraft performance data representative of a second measurement of speed and altitude subsequent to the first aircraft performance data being acquired;
      determine actual aircraft energy data as a function of at least the second aircraft performance data; and
      generate presentation data as a function of the reference aircraft energy data and the actual aircraft energy data, where
         the presentation data is representative of at least one image of a scaled, aircraft energy indicator comprised of a reference position and a graphical indication and presentable to a pilot when provided to a visual display unit, such that
            a deviation of the graphical indication from the reference position indicates a deviation of actual aircraft energy from reference aircraft energy, where
            the deviation of the graphical indication from the reference position enhances a pilot's situational awareness by indicating either an excess or a shortage of aircraft energy.

2. The system of claim 1, wherein the first aircraft performance data and the second aircraft performance data are each further representative of a measurement of weight.

3. The system of claim 1, wherein
   the descent path is a flight idle descent path from which
      a correlation exists between a plurality of altitudes and a plurality of reference speeds, where
      one altitude is correlated to one reference speed.

4. The system of claim 1, wherein
   the reference aircraft energy data is representative of at least one measurement of
      reference aircraft potential energy,
      reference aircraft kinetic energy, and
      reference aircraft total energy.

5. The system of claim 1, wherein
   the actual aircraft energy data is representative of at least one measurement of
      actual aircraft potential energy,
      actual aircraft kinetic energy, and
      actual aircraft total energy.

6. The system of claim 1, wherein the graphical indication is provided by a variably-sized bar, the size of which is dependent upon the deviation of actual aircraft energy from reference aircraft energy.

7. The system of claim 1, wherein the presentation data is further representative of at least one of an aural advisory and a tactile advisory presentable via an aural advisory unit and a tactile advisory unit, respectively.

8. A device for generating an aircraft energy indicator, comprising:
   an image generator configured to:
      acquire first aircraft performance data representative of at least first measurements of speed and altitude;
      determine descent path data representative of a descent path as a function of at least the first aircraft performance data;
      determine reference aircraft energy data as a function of at least the descent path data;
      acquire second aircraft performance data representative of a second measurement of speed and altitude subsequent to the first aircraft performance data being acquired;
      determine actual aircraft energy data as a function of at least the second aircraft performance data; and
      generate presentation data as a function of the reference aircraft energy data and the actual aircraft energy data, where
         the presentation data is representative of at least one image of a scaled, aircraft energy indicator comprised of a reference position and a graphical indication and presentable to a pilot when provided to a visual display unit, such that
            a deviation of the graphical indication from the reference position indicates a deviation of actual aircraft energy from reference aircraft energy, where
            the deviation of the graphical indication from the reference position enhances a pilot's situational awareness by indicating either an excess or a shortage of aircraft energy.

9. The device of claim 8, wherein the first aircraft performance data and the second aircraft performance data are each further representative of a measurement of weight.

10. The device of claim 8, wherein
    the descent path is a flight idle descent path from which
       a correlation exists between a plurality of altitudes and a plurality of reference speeds, where
       one altitude is correlated to one reference speed.

11. The device of claim 8, wherein
    the reference aircraft energy data is representative of at least one measurement of
       reference aircraft potential energy,
       reference aircraft kinetic energy, and
       reference aircraft total energy.

12. The device of claim 8, wherein
the actual aircraft energy data is representative of at least one measurement of
actual aircraft potential energy,
actual aircraft kinetic energy, and
actual aircraft total energy.

13. The device of claim 8, wherein the graphical indication is provided by a variably-sized bar, the size of which is dependent upon the deviation of actual aircraft energy from reference aircraft energy.

14. The device of claim 8, wherein the presentation data is further representative of at least one of an aural advisory and a tactile advisory presentable via an aural advisory unit and a tactile advisory unit, respectively.

15. A method for generating an aircraft energy indicator, comprising:
acquiring first aircraft performance data representative of at least first measurements of speed and altitude;
determining descent path data representative of a descent path as a function of at least the first aircraft performance data;
determining reference aircraft energy data as a function of at least the descent path data;
acquiring second aircraft performance data representative of a second measurement of speed and altitude subsequent to the first aircraft performance data being acquired;
determine actual aircraft energy data as a function of at least the second aircraft performance data; and
generating presentation data as a function of the reference aircraft energy data and the actual aircraft energy data, where
the presentation data is representative of at least one image of a scaled, aircraft energy indicator comprised of a reference position and a graphical indication and presentable to a pilot when provided to a visual display unit, such that
a deviation of the graphical indication from the reference position indicates a deviation of actual aircraft energy from reference aircraft energy, where
the deviation of the graphical indication from the reference position enhances a pilot's situational awareness by indicating either an excess or a shortage of aircraft energy.

16. The method of claim 15, wherein the first aircraft performance data and the second aircraft performance data are each further representative of a measurement of weight.

17. The method of claim 15, wherein
the descent path is a flight idle descent path from which
a correlation exists between a plurality of altitudes and
a plurality of reference speeds, where
one altitude is correlated to one reference speed.

18. The method of claim 15, wherein
the reference aircraft energy data is representative of at least one measurement of
reference aircraft potential energy,
reference aircraft kinetic energy, and
reference aircraft total energy.

19. The method of claim 15, wherein
the actual aircraft energy data is representative of at least one measurement of
actual aircraft potential energy,
actual aircraft kinetic energy, and
actual aircraft total energy.

20. The method of claim 15, wherein the graphical indication is provided by a variably-sized bar, the size of which is dependent upon the deviation of actual aircraft energy from reference aircraft energy.

\* \* \* \* \*